United States Patent
Hsu et al.

(10) Patent No.: US 11,659,487 B2
(45) Date of Patent: May 23, 2023

(54) WIRELESS DEVICE AND ASSOCIATED WIRELESS COMMUNICATION METHOD

(71) Applicant: MEDIATEK INC., Hsin-Chu (TW)

(72) Inventors: Tsai-Yuan Hsu, Hsinchu (TW); Chia-Shun Wan, Hsinchu (TW); Chia-Yang Hsieh, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 214 days.

(21) Appl. No.: 17/027,719

(22) Filed: Sep. 22, 2020

(65) Prior Publication Data
US 2022/0095222 A1    Mar. 24, 2022

(51) Int. Cl.
| | | |
|---|---|---|
| H04W 52/02 | (2009.01) | |
| H04W 4/80 | (2018.01) | |
| H04W 72/12 | (2023.01) | |
| H04W 84/12 | (2009.01) | |

(52) U.S. Cl.
CPC ......... *H04W 52/0216* (2013.01); *H04W 4/80* (2018.02); *H04W 52/0229* (2013.01); *H04W 72/1215* (2013.01); *H04W 84/12* (2013.01)

(58) Field of Classification Search
CPC ............... H04W 52/0216; H04W 4/80; H04W 52/0229; H04W 84/12; H04W 84/18; H04L 5/0053

See application file for complete search history.

(56) References Cited

U.S. PATENT DOCUMENTS

| | | | |
|---|---|---|---|
| 2014/0219216 A1* | 8/2014 | Lee ..................... | H04W 88/06 370/329 |
| 2014/0369272 A1 | 12/2014 | Amini | |
| 2017/0064619 A1* | 3/2017 | Neelisetty ............... | H04L 43/12 |
| 2017/0347373 A1* | 11/2017 | Vig ......................... | H04W 4/80 |
| 2019/0174418 A1* | 6/2019 | Kencharla ............. | H04L 5/0053 |

FOREIGN PATENT DOCUMENTS

| | | |
|---|---|---|
| CN | 107211372 B | 6/2020 |
| TW | I499320 B | 9/2015 |

* cited by examiner

*Primary Examiner* — Vinncelas Louis
(74) *Attorney, Agent, or Firm* — Winston Hsu (57) ABSTRACT

The present invention provides a wireless device including a first wireless module and a second wireless module is disclosed. The first wireless module is configured to transmit data periodically, the second wireless module is configured to communicate with an electronic device, and the second wireless module and the first wireless module perform data transmission/reception based on a time-division multiplexing method. In addition, the second wireless module determines a wake interval and a doze interval based on traffic characteristics of the first wireless module.

12 Claims, 7 Drawing Sheets

WIRELESS DEVICE AND ASSOCIATED WIRELESS COMMUNICATION METHOD

BACKGROUND

The current wireless device generally comprises at least two wireless modules such as Wi-Fi module and Bluetooth (BT) module. Considering smaller antenna isolation or a single antenna used in the current wireless device, a time-division multiplexing (TDM) method is used by the Wi-Fi module and the BT module to transmit/receive data. However, when both the Wi-Fi module and the BT module are used to transmit data, using the TDM method will cause an overhead of a protection negotiation of the Wi-Fi module, and the channel utilization is also reduced. Specifically, the Wi-Fi module and the BT module are controlled to transmit/receive data alternately, and before the BT module starts to transmit/receive data, the Wi-Fi module needs a frame negotiation time to send a protection frame, such as a power-save frame or a serial clear to send to self (CTS2Self), to stop the data transmission of peer devices. This frame negotiation time increases the overhead of the Wi-Fi module and reduces the channel utilization of the Wi-Fi module.

SUMMARY

It is therefore an objective of the present invention to provide a wireless communication method, which controls the W-Fi transmission of a peer device to align a periodic traffic pattern of the BT module to reduce the overhead of the Wi-Fi protection negotiation, to solve the above-mentioned problems.

According to one embodiment of the present invention, a wireless device comprising a first wireless module and a second wireless module is disclosed. The first wireless module is configured to transmit data periodically, the second wireless module is configured to communicate with an electronic device, and the second wireless module and the first wireless module perform data transmission/reception based on a time-division multiplexing method. In addition, the second wireless module determines a wake interval and a doze interval based on traffic characteristics of the first wireless module.

According to another embodiment of the present invention, a wireless communication method of a wireless device is disclosed. The wireless communication method comprises the steps of: activating a first wireless module and a second wireless module within the wireless device; activating a protection mechanism, wherein the second wireless module and the first wireless module perform data transmission/reception based on a time-division multiplexing method, and the protection mechanism controls the second wireless module to broadcast a protection frame to notify an electronic device to stop transmitting data before the first wireless module starts to transmit data; determining a wake interval and a doze interval for the second wireless module based on traffic characteristics of the first wireless module; and controlling the second wireless module to communicate with the electronic device by using the wake interval and the doze interval.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
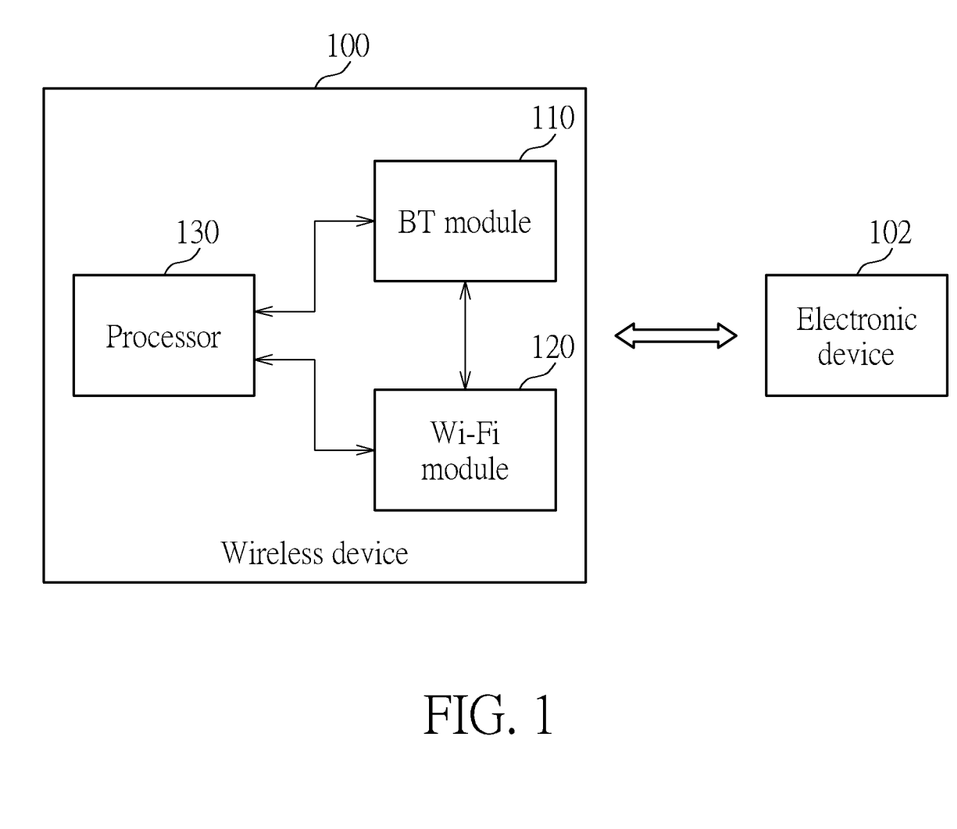
FIG. 1 is a diagram illustrating a wireless device according to one embodiment of the present invention.

FIG. 1 is a diagram illustrating a wireless device 100 according to one embodiment of the present invention. As shown in FIG. 1, the wireless device 100 comprises two wireless modules (in this embodiment, the wireless modules are BT module 110 and Wi-Fi module 120) and a processor 130. In this embodiment, the wireless device 100 can be a cell phone, a tablet, a notebook, or any other electronic device capable of wirelessly communicating with one or more electronic devices such as the electronic device 102.

In this embodiment, the electronic device 102 serves as an access point (AP), and the wireless device 100 and the electronic device 102 supports the target wake time (TWT) mechanism in the IEEE 802.11ah specification and IEEE 802.11ax specification. The TWT mechanism permits the access point and the station (i.e. the wireless device 100) to exchange information that includes expected activity duration, where the station may enter the doze state based on this information to reduce the power consumption, and the station and the access point wake up and have data transmission/reception at the negotiated times.

Figure 2:
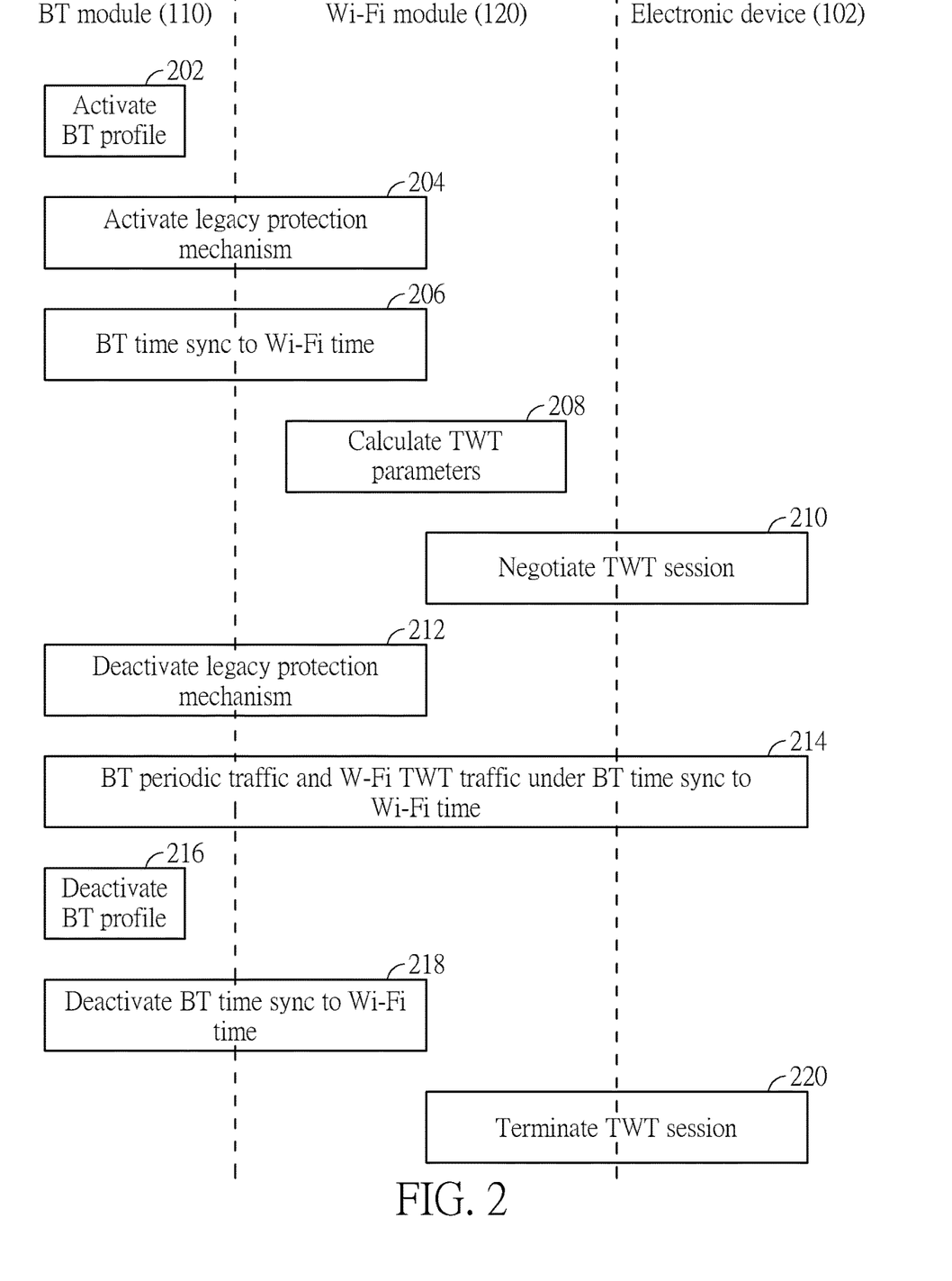
FIG. 2 shows a flow and a timing diagram of the wireless device according to one embodiment of the present invention.

FIG. 2 shows a flow and a timing diagram of the wireless device 100 according to one embodiment of the present invention. Initially, the wireless device 100 builds a link with the electronic device 102 by using the Wi-Fi module 120. In Step 202, the processor 130 activates a BT profile of the BT module 110, and the BT module 110 can start to transmit data to another electronic device. In this embodiment, the BT module 110 has a periodic traffic, that is the data transmission is enabled and disabled alternately, and the data transmission is performed periodically. In Step 204, the BT module 110 and the Wi-Fi module 120 use the legacy protection mechanism to transmit/receive data. Taking FIG. 3 as an example, the TDM method is applied, and the BT module 110 and the Wi-Fi module 120 transmit data alternately. In the beginning of the Wi-Fi traffic, the Wi-Fi module 120 broadcasts a power-save frame having an indicator "0" or a contention-free end acknowledge (CF-End) to notify the electronic device 102 and/or other electronic devices that the Wi-Fi data transmission is allowed. In addition, before the BT module 120 starts the data transmission, the Wi-Fi module 120 executes the frame negotiation to broadcast a power-save frame having the indicator "1" or the serial clear to send to self (CTS2Self), to notify the electronic device 102 and/or other electronic devices that the Wi-Fi data transmission is not allowed. Only after the frame negotiation is completed, the BT module 110 starts to transmit data.

Figure 4:
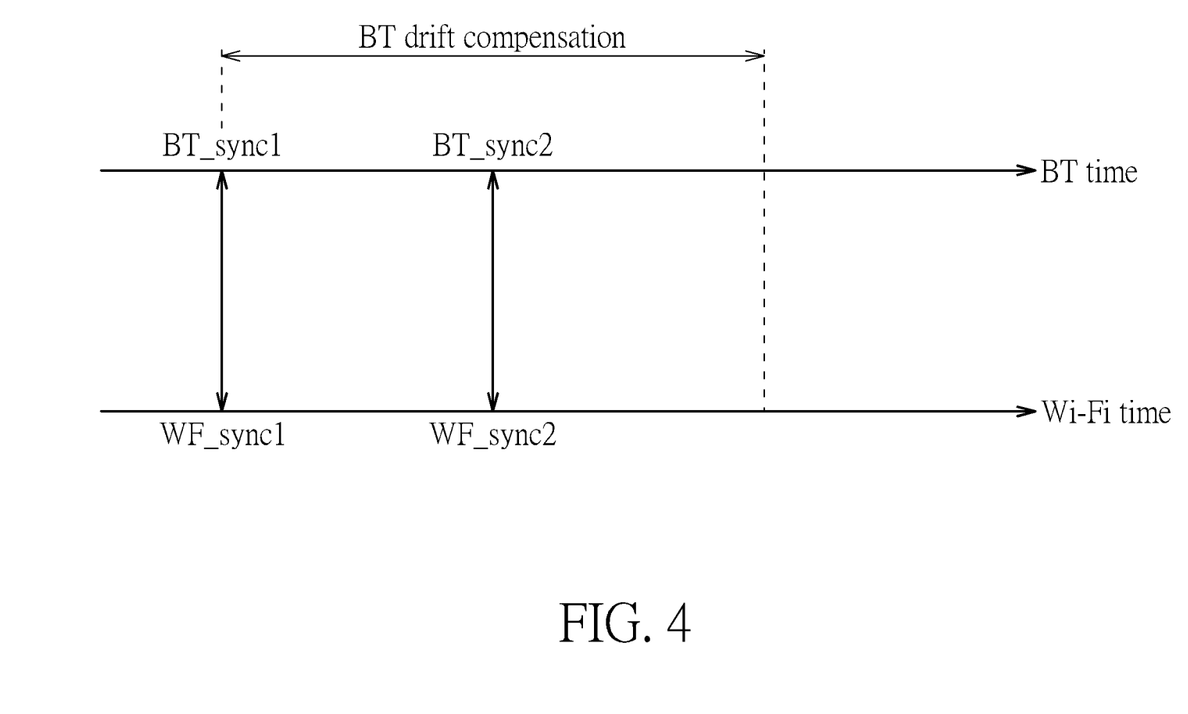
FIG. 4 is a BT drift compensation according to one embodiment of the present invention.
Figure 5:
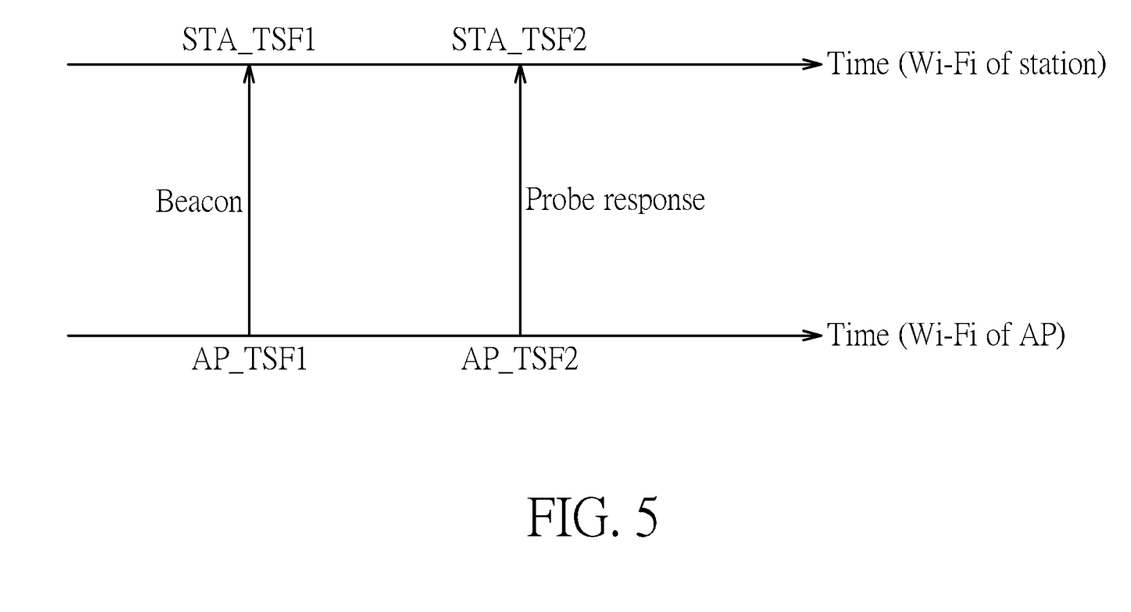
FIG. 5 shows synchronization between access point and station according to one embodiment of the present invention.

In Step 206, the BT module 110 performs a time synchronization to align the timing of the Wi-Fi module 120. Specifically, the BT module 110 and the Wi-Fi module 120 use different clock sources, so the BT time needs a drift compensation to align the Wi-Fi time. Taking FIG. 4 as an example, the BT module 110 and the Wi-Fi module 120 may get a first BT time BT_sync1 and a first Wi-Fi time WF_sync1 simultaneously, the BT module 110 and the Wi-Fi module 120 may further get a second BT time BT_sync2 and a second Wi-Fi time WF_sync2 simultaneously, and a time drift rate is calculated by using a formula as follows: (WF_sync2−WF_sync1)/(BT_sync2−BT_sync1). The BT time drift compensation can be obtained by multiplying the time drift rate by the BT time elapsed. In addition, because the electronic device 102 serves as the access point and the wireless device 100 serves as the station, the Wi-Fi module 120 needs to perform the time synchronization to align the timing of the Wi-Fi module within the electronic device 102. Taking FIG. 5 as an example, the electronic device 102 transmits packets having time synchronization function (TSF) timestamps to the wireless device 100 for the time synchronization, for example, the electronic device 102 may transmit a beacon having the TSF timestamp AP_TSF1 to the wireless device 100 while the Wi-Fi module 120 has the TSF timestamp STA_TSF1, and the electronic device 102 may transmit a probe response frame having the TSF timestamp AP_TSF2 to the wireless device 100 while the Wi-Fi module 120 has the TSF timestamp STA_TSF2. Then, the Wi-Fi module 120 may align the timing of the electronic device 102 based on the received TSF timestamp AP_TSF1/AP_TSF2. In addition, the BT time of the BT module 110 needs to be adjusted according to a difference between the timing between the wireless device 100 and the electronic device 102, that is, the BT time is adjusted by using (AP_TSF1−STA_TSF1) or (AP_TSF2−STA_TSF2).

Figure 6:
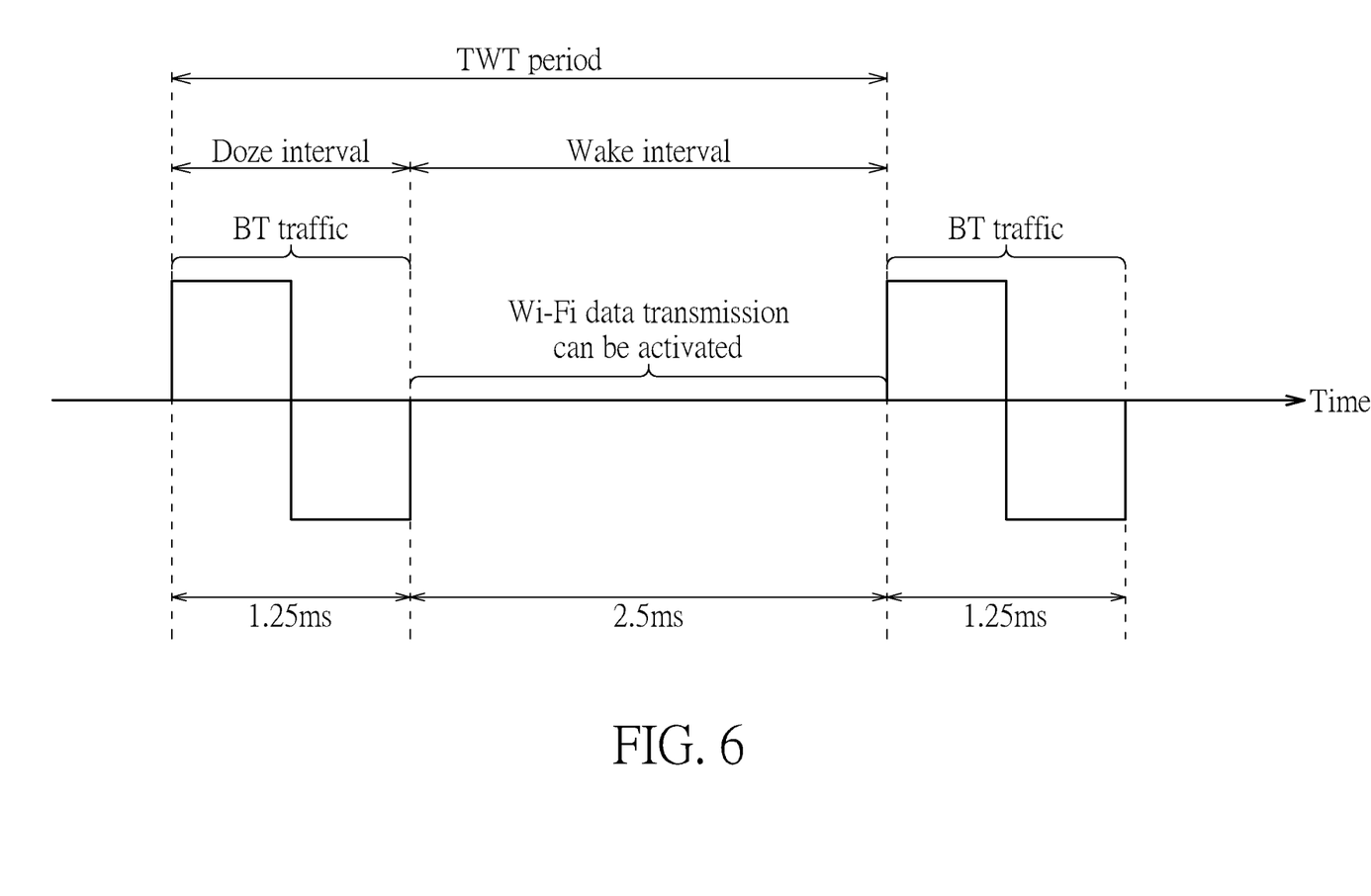
FIG. 6 is a diagram of calculating the TWT parameters according to one embodiment of the present invention.
Figure 7:
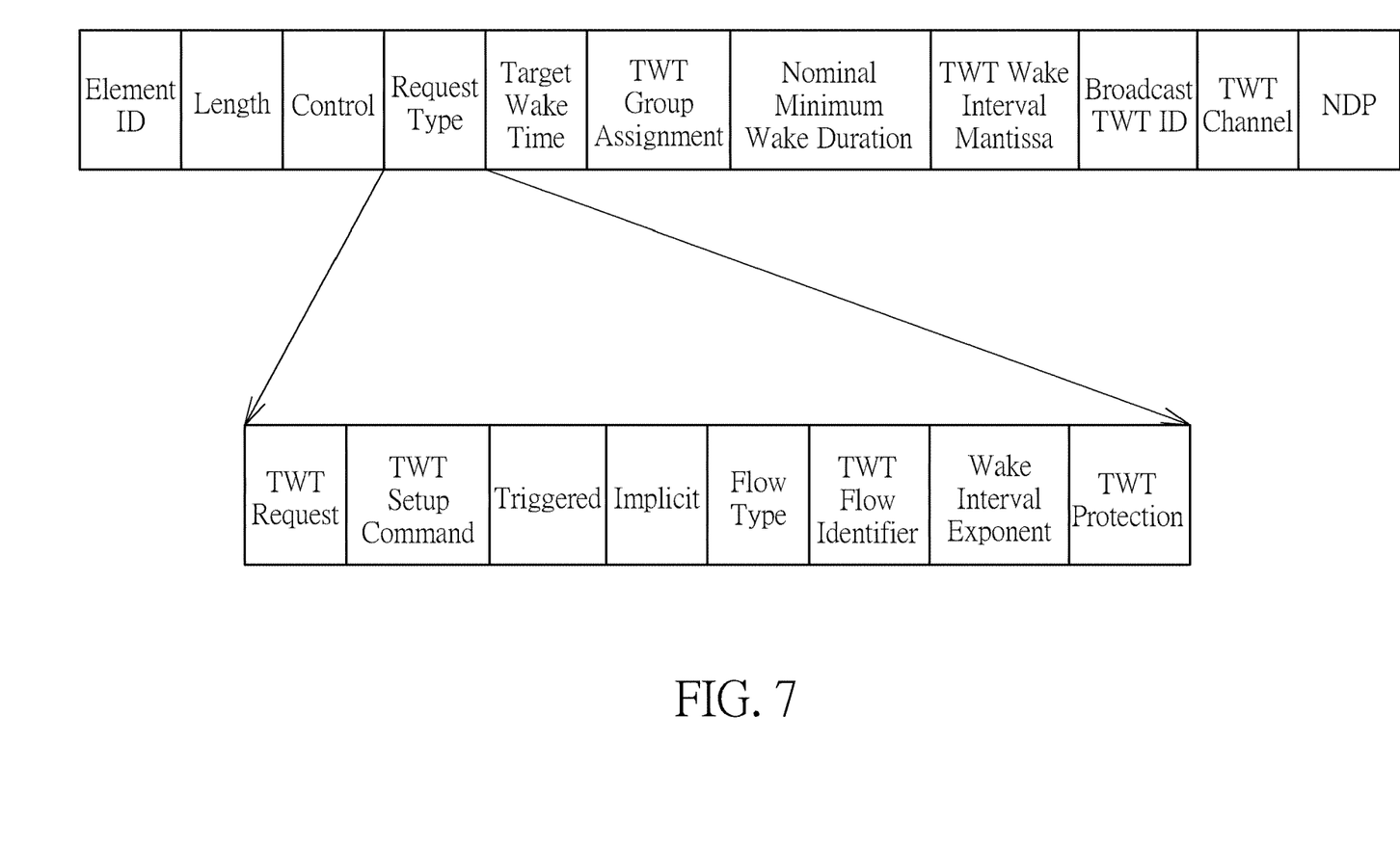
FIG. 7 shows a TWT request according to one embodiment of the present invention.

In Step 208, the Wi-Fi module 120 calculates the parameters of the TWT mechanism based on the BT traffic characteristics and the alignment of Wi-Fi time and BT time. Specifically, because the BT module 110 has the periodic traffic and the Wi-Fi time and BT time are aligned, the Wi-Fi module 120 may refer to this information to determine the parameters comprising a TWT period, a wake interval, a doze interval, a ratio about the wake interval, or a ratio about the doze interval, wherein the parameters can be determined so that the wake interval does not overlap with the data transmission of the BT module 110. Taking FIG. 6 as an example, the BT module 110 transmits the information comprising a start time, a duration and an interval of the BT data transmission to the Wi-Fi module 120, and the Wi-Fi module 110 can determine that the TWT period is equal to the interval of the BT data transmission, the doze interval may overlap with the BT traffic, the wake interval does not overlap with the BT traffic. In Step 210, the Wi-Fi module 120 sends a TWT request comprising the above parameters to the electronic device 102. FIG. 7 shows the TWT request according to one embodiment of the present invention. As shown in FIG. 7, the TWT request may comprise the element ID, a length of the TWT request, a control symbol, a request type, a target wake time, a TWT group assignment, a nominal minimum wake duration, TWT wake interval mantissa, broadcast TWT ID, TWT channel and a data packet paging (NDP), wherein the request type may comprise a TWT request, a TWT setup command, triggered information, implicit information, a flow type, a TWT flow identifier, a wake interval exponent and a TWT protection. In this embodiment, the parameters comprising the TWT period, the wake interval and the doze interval are included in one or more fields shown in FIG. 7.

Figure 3:
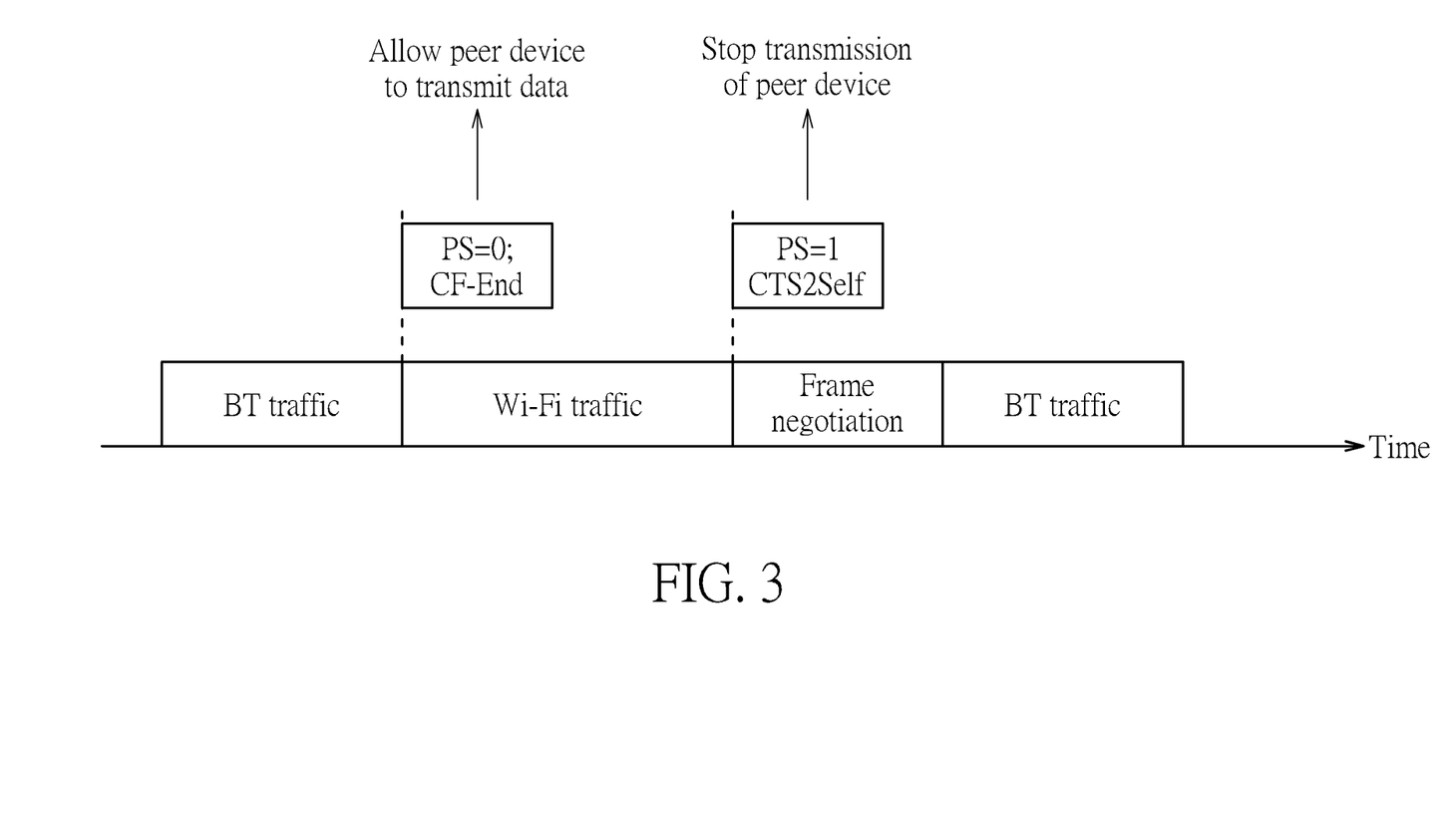
FIG. 3 shows a legacy protection mechanism of Wi-Fi traffic and BT traffic.

In Step 212, the processor 130 deactivates the legacy protection mechanism shown in FIG. 3, that is the Wi-Fi module 120 does not broadcast the power-save frame or the contention-free end acknowledge to notify the electronic device 102 and/or other electronic devices that the Wi-Fi data transmission is allowed, and/or the Wi-Fi module 120 does not broadcast the power-save frame or the CT2Self to notify the electronic device 102 and/or other electronic devices that the Wi-Fi data transmission is not allowed.

In Step 214, the BT module 110 periodically transmits data to the other electronic device, and the Wi-Fi module 120 is communicated with the electronic device 102 based on the TWT mechanism. The BT traffic and the Wi-Fi traffic may refer to FIG. 6, and no protection frame such as the power-save frame, the contention-free end acknowledge or the CT2Self is broadcasted by the Wi-Fi module 120 to the frame negotiation. It is noted that, during the data transmission, the BT module 120 keeps compensating the BT time offset to align the BT time and the Wi-Fi time. Specifically, the BT time drift may be compensated for every BT frame, and the BT time is compensated by using the difference between the TSF timestamp of the wireless device 100 and the TSF timestamp of the electronic device after the Wi-Fi time of the wireless device 100 is synchronized with the Wi-Fi time of the electronic device 102.

In Step 216, the BT traffic is deactivated. In Step 218, the BT module 110 stops synchronizing with the Wi-Fi module 120. In Step 220, the Wi-Fi module 120 terminates the TWT session or changes the parameters of the TWT mechanism.

In the embodiment shown in FIG. 2, the Wi-Fi module 120 determines the parameters of the TWT mechanism based on the BT periodic traffic pattern to reduce the overhead of Wi-Fi protection negotiation, and the channel utilization for the Wi-Fi communications is improved. In addition, because the BT time is synchronized with the Wi-Fi time frequently, the Wi-Fi module 120 of the wireless device 100 does not need to re-negotiate the TWT mechanism (e.g. changing the TWT parameters) with the electronic device 102, to reduce load of the Wi-Fi communications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A wireless device, comprising:
a first wireless module circuit, configured to transmit data periodically; and
a second wireless module circuit, wherein the second wireless module circuit is configured to communicate with an electronic device, the second wireless module circuit and the first wireless module circuit perform data transmission/reception based on a time-division multiplexing method;

wherein the second wireless module circuit determines a wake interval and a doze interval based on traffic characteristics of the first wireless module circuit;

wherein the first wireless module circuit compensates a time drift to align its timing with the timing of the second wireless module circuit.

2. The wireless device of claim 1, wherein the first wireless module circuit is a Bluetooth module, and the second wireless module circuit is a Wi-Fi module.

3. The wireless device of claim 2, wherein the second wireless module circuit determines parameters of a target wake time (TWT) mechanism, the parameters comprises the wake interval and the doze interval, and the second wireless module circuit sends a TWT request comprising the parameters to the electronic device for TWT negotiation.

4. The wireless device of claim 2, wherein the second wireless module circuit and the first wireless module circuit transmit data alternately, and before the first wireless module circuit starts to transmit the data, the first wireless module circuit does not broadcast any protection frame to notify the electronic device that the data transmission is not allowed.

5. The wireless device of claim 1, wherein the first wireless module circuit calculates a time drift rate according to the timings of the first wireless module circuit and the timings of the second wireless module circuit, and the first wireless module circuit compensates the time drift to align its timing with the timing of the second wireless module circuit.

6. The wireless device of claim 1, wherein the second wireless module circuit performs a time synchronization to align timing of the electronic device, and the timing of the first wireless module circuit is adjusted according to a difference between the timings between the second wireless module circuit and the electronic device.

7. A wireless communication method of a wireless device, comprising:

activating a first wireless module and a second wireless module within the wireless device;

activating a protection mechanism, wherein the second wireless module and the first wireless module perform data transmission/reception based on a time-division multiplexing method, and the protection mechanism controls the second wireless module to broadcast a protection frame to notify an electronic device to stop transmitting data before the first wireless module starts to transmit data;

determining a wake interval and a doze interval for the second wireless module based on traffic characteristics of the first wireless module;

controlling the second wireless module to communicate with the electronic device by using the wake interval and the doze interval; and before the step of determining the wake interval and the doze interval for the second wireless module, compensating a time drift of the first wireless module to align its timing with the timing of the second wireless module.

8. The wireless communication method of claim 7, wherein the first wireless module is a Bluetooth module, and the second wireless module is a Wi-Fi module.

9. The wireless communication method of claim 8, further comprising:

determining parameters of a target wake time (TWT) mechanism, wherein the parameters comprises the wake interval and the doze interval; and controlling the second wireless module sends a TWT request comprising the parameters to the electronic device for TWT negotiation.

10. The wireless communication method of claim 8, wherein the second wireless module and the first wireless module transmit data alternately, and the wireless communication method further comprises:

after the second wireless module is controlled to communicate with the electronic device by using the wake interval and a doze interval, before the first wireless module starts to transmit the data, the protection mechanism is deactivated, and the first wireless module does not broadcast any protection frame to notify the electronic device that the data transmission is not allowed.

11. The wireless communication method of claim 7, further comprising:

calculating a time drift rate according to the timings of the first wireless module and the timings of the second wireless module; for compensating the time drift of the first wireless module to align its timing with the timing of the second wireless module.

12. The wireless communication method of claim 7, further comprising:

controlling the second wireless module to perform a time synchronization to align timing of the electronic device; and adjusting the timing of the first wireless module according to a difference between the timings between the second wireless module and the electronic device.

* * * * *